April 26, 1949.  A. J. MUSSELMAN  2,468,304
TIRE FABRIC
Filed April 3, 1947

INVENTOR.
ALVIN J. MUSSELMAN
BY
Kwis, Hudson, Boughton & Williams
ATTORNEYS

Patented Apr. 26, 1949

2,468,304

UNITED STATES PATENT OFFICE 2,468,304

TIRE FABRIC

Alvin J. Musselman, Santa Barbara, Calif.

Application April 3, 1947, Serial No. 739,241

7 Claims. (Cl. 154—52)

This invention relates to improvements in tire fabric, that is to say fabric employed as a base and reinforcement for the rubber of a pneumatic tire.

I have found that nylon cord has superior characteristics which are advantageous in a tire fabric, amongst which characteristics are strength and resilience much greater than that of cotton cord. The movements of the nylon cords relative to each other in the flexing of the finished tire as it runs over the road are also freer than in the case of cotton fabric tires, and such flexibility of course is important because it makes the tire more yieldable when small obstacles are encountered. A wheel which is equipped with a tire that merely yields to accommodate an obstruction instead of riding up over the obstruction requires less power because the weight supported upon the wheel does not have to be lifted.

I have also found however that rubber does not adhere to nylon fabric with the same tenacity as to cotton fabric, and that consequently there is not as good a union as could be desired between the fabric and the tread in a nylon tire as heretofore constructed. This I believe is due to the fact that the nylon filaments in the cord are smooth and continuous and that nylon fabric therefore does not have the benefit of a multitude of short ends to which the rubber may attach itself as in the case of cotton fabric or cord tires.

On of the objects of the present invention therefore is the provision of a tire fabric that shall partake of the strength and resilience of nylon and yet one which will adhere tightly to rubber.

Figure 1:
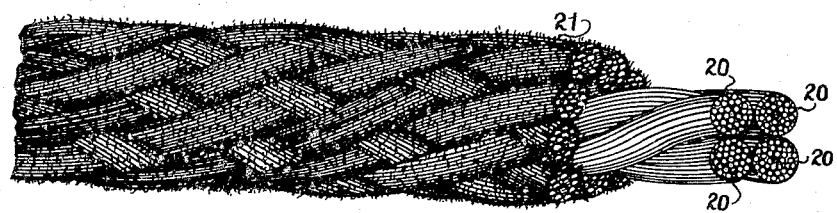

Other objects and features of novelty will appear as I proceed with the description of those embodiments of the invention which, for the purposes of the present application, I have illustrated in the accompanying drawing, in which Fig. 1 represents on a highly magnified scale a nylon cord covered with braided cotton fiber.

Figure 2:
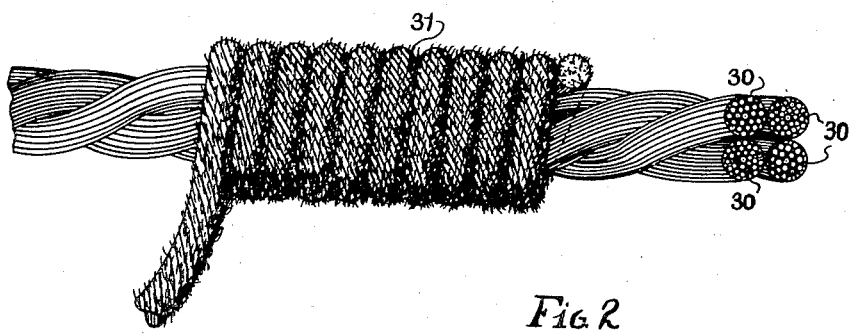
Figure 3:
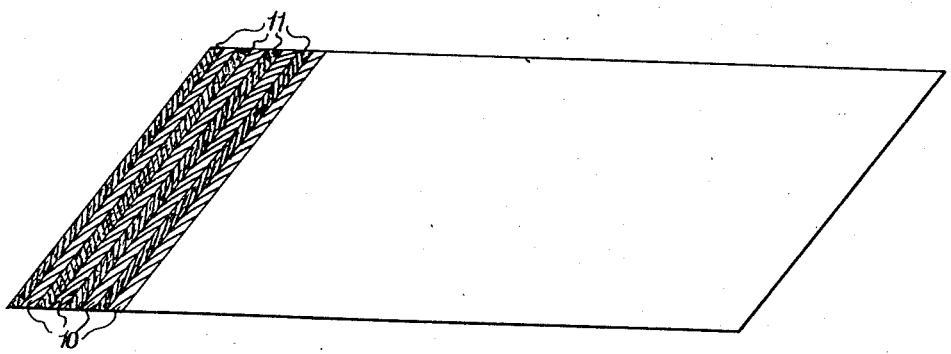

Fig. 2 is a similar view showing a covering for a nylon cord consisting of a winding of cotton yarn, and Fig. 3 is a fragmentary plan view of a piece of diagonally cut tire fabric comprising alternating nylon and cotton cords.

In the drawing I have illustrated more or less diagrammatically three forms of the present invention. Referring first to Fig. 3 I have shown a strip of fabric cut on the bias with alternating cords 10 of nylon and 11 of cotton. As explained in my copending application Serial No. 717,057 filed December 18, 1946, this fabric may be formed by winding cord around a drum, coating the winding with rubber cement or other adhesive, and after the cement is set cutting the winding along a spiral line. By winding the drum with alternating nylon and cotton cords the product illustrated in Fig. 3 is obtained. The cotton cord need not be of high quality, that is to say it need not be made of long staple cotton. On the contrary short fibers are best for the purpose, because the shorter the filaments the more numerous the filament ends, which constitute anchors for the rubber or cement.

In Fig. 1 the reference numeral 20 is applied to each of four strands making up a nylon cord, magnified about fifteen or twenty diameters. After the strands are twisted together a covering 21 of braided cotton threads is formed around the nylon cord. By means of a covering of this kind the rubber or other plastic contacts the cotton fibers only, making a firm connection with them, while the enclosed nylon cord is free to slide within the covering and hence promotes flexing of the finished tire when in use and reduces the power required to drive a wheel so equipped.

In Fig. 2 the four nylon strands making up a nylon cord are indicated at 30. In this case the covering for the nylon is made up of a winding 31 of cotton thread or cord. The general effect is much the same as in the case of the covering illustrated in Fig. 1, and has the same advantages.

It will be understood that either of the cotton covered nylon cords illustrated in Figs. 1 and 2 may be used exclusively in making up a fabric similar to that illustrated in Fig. 3, that is to say in such cases all cords are covered and no nylon is exposed to the rubber or other plastic. The adhesion of the rubber to the fabric therefore is at least as good as with ordinary cotton fabric. In fact when short staple cotton is used, as it may well be, the adhesion is better than in the case of fabric made from high grade long staple cotton.

Having thus described my invention, I claim:

1. A fabric for use in the manufacture of tires and other rubber articles, comprising nylon cords certain of which are encased in fibrous material having non-continuous filaments, said encased cords being disposed side by side in juxtaposition and bound together by an adhesive coating containing rubber, the nylon cords being free to stretch lengthwise within and independently of said fibrous material.

2. A fabric as defined in claim 1, wherein the said fibrous material consists of vegetable fibers.

3. A fabric as defined in claim 1, wherein the said fibrous material consists of cotton fibers.

4. A fabric as defined in claim 1, wherein said fibrous material consists of cotton yarn.

5. A fabric as defined in claim 4, wherein said cotton yarn is of the type known as short fiber yarn.

6. A fabric for use in the manufacture of tires and other rubber articles, comprising nylon cords covered with a winding of cotton yarn, said covered cords being disposed side by side in juxtaposition and bound together by an adhesive coating containing rubber, the nylon cords being free to stretch lengthwise independently of said covering.

7. A fabric for use in the manufacture of tires and other rubber articles, comprising nylon cords covered with braided cotton yarn, said covered cords being disposed side by side in juxtaposition and bound together with an adhesive coating containing rubber, the nylon cords being free to stretch lengthwise independently of said braided cotton covering.

ALVIN J. MUSSELMAN.

REFERENCES CITED

The following references are of record in the file of this patent:

UNITED STATES PATENTS

| Number | Name | Date |
| --- | --- | --- |
| 2,298,071 | Smith | Oct. 6, 1942 |
| 2,313,058 | Francis, Jr. | Mar. 9, 1943 |